(12) United States Patent
Aitken

(10) Patent No.: US 9,987,768 B2
(45) Date of Patent: Jun. 5, 2018

(54) COMPOSITE TOOLS AND METHODS FOR FABRICATING COMPOSITE TOOLS

(71) Applicant: Gulfstream Aerospace Corporation, Savannah, GA (US)

(72) Inventor: Charles Aitken, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 85 days.

(21) Appl. No.: 15/086,418

(22) Filed: Mar. 31, 2016

(65) Prior Publication Data

US 2017/0282411 A1 Oct. 5, 2017

(51) Int. Cl.
*B29C 33/00* (2006.01)
*B29K 63/00* (2006.01)
*B29K 79/00* (2006.01)
*B29L 31/00* (2006.01)

(52) U.S. Cl.
CPC .......... *B29C 33/00* (2013.01); *B29K 2063/00* (2013.01); *B29K 2079/00* (2013.01); *B29L 2031/757* (2013.01)

(58) Field of Classification Search
CPC .......... B29C 35/00; B29C 70/30; B29C 70/34
See application file for complete search history.

(56) References Cited

U.S. PATENT DOCUMENTS

2007/0012858 A1* 1/2007 Callis .................... B29C 33/38
249/134

OTHER PUBLICATIONS

Ginger Gardiner, BMI and Benzoxazine Battle for Future OOA Aerocomposites, High Performance Composites E-Newsletter, Jan. 1, 2014, CW Composites World.

* cited by examiner

*Primary Examiner* — James Sanders
(74) *Attorney, Agent, or Firm* — LKGlobal | Lorenz & Kopf, LLP

(57) ABSTRACT

Methods for fabricating composite tools and composite tools are provided. In an exemplary embodiment, a method for fabricating a composite tool includes providing a master mold and forming a low temperature cured resin laminate overlying the master mold. The low temperature cured resin laminate is heated and compressed to form a cured low temperature cured resin laminate, the low temperature cured resin laminate heated to a first temperature. The cured low temperature cured resin laminate is removed from the master mold and a high temperature cured resin laminate is formed overlying the cured low temperature cured resin laminate. The high temperature cured resin laminate is heated and compressed to form a cured high temperature cured resin laminate. The high temperature cured resin laminate is heated to a second temperature, wherein the second temperature is higher than the first temperature.

19 Claims, 5 Drawing Sheets

COMPOSITE TOOLS AND METHODS FOR FABRICATING COMPOSITE TOOLS

TECHNICAL FIELD

The present invention generally relates to methods for fabricating composite tools and to composite tools made from such methods, and more particularly relates to methods for fabricating composite tools that utilize low temperature cured resin layers and high temperature cured resin layers and to such composite tools.

BACKGROUND

High temperature curing matrix resins such as bismaleimide ("BMI") and benzoxazine (referred to collectively herein as "the high temperature cured resins") recently have been used to fabricate tooling to make composite parts for a variety of industries, such as the avionics and aerospace industries. BMI and benzoxazine exhibit higher glass transition temperatures than epoxy resins that traditionally have been used in such composite tooling. In this regard, the high temperature cured resins provide higher durability than epoxy resins and are able to be machined unlike epoxy resins.

However, the manufacture of composite tooling using BMI and bismaleimide has been costly and time intensive. A typical manufacturing method for making tooling used to make parts for, for example, the avionics industry is illustrated in FIGS. 1-3. Referring to FIG. 1, the method for making a tool begins by making a master mold 10. The master mold typically is formed from an inexpensive and easily cut material, such as medium density fiberboard or foam, which is cut, such as by computer numeric control (CNC) machining, to have a surface 12 that is identical in topography to a surface of a part desired to be manufactured from the tool, such as, for example, an aileron for an aircraft. An intermediate mold 14 is formed overlying the surface 12 of the master mold 10 by arranging a number of low-temperature cured epoxy resin prepreg plies thereon. The intermediate mold 14 is formed usually at thicknesses of about 6.4 millimeters (mm) (0.25 inches). The intermediate mold 14 is cured at relatively low temperatures, typically at temperatures in the range of 48 to 60° C. (120 to 140° F.). A supporting substructure 16 then is attached to the intermediate mold 14 using fixing methods such as adhesives and laminate tie plies. The master mold 10 is separated from the intermediate mold 14 and the intermediate mold next is post-cured, typically at temperatures in the range of 176 to 191° C. (350 to 375° F.).

Referring to FIG. 2, a laminate layer 18 of BMI or benzoxazine prepreg plies is formed overlying the intermediate mold. The laminate layer is heated, typically to a temperature in the range of about 176 to 191° C. (350 to 375° F.) depending on the BMI or benzoxazine used, to cure the laminate layer 18. The resulting cured laminate layer 18 typically has a thickness of about 9.525 mm (0.375 inches). A substructure 20 is affixed to the laminate layer 18 using fixing methods such as adhesives and laminate tie plies forming a tool 22. The tool 22 is removed from the intermediate mold 14 and is post-cured at a temperature typically in the range of 204 to 216° C. (400 to 420° F.) depending on the BMI or benzoxazine prepreg plies used. Referring to FIG. 3, as the laminate layer 18 has a surface 26 that is the negative of the surface 12 of the master mold 10, a part 24 then can be formed using the tool 22 with the part having a surface 28 that mimics the surface 12 of the master mold.

The above-described traditional method provides a number of drawbacks. The method requires four heating cycles to cure the intermediate mold and the laminate layer. Each heating cycle adds time to and increases cost of the manufacturing of the composite tool. In addition, the intermediate mold 14 and the laminate layer 18 are formed with relatively large thicknesses so that each layer has a relatively uniform thickness with minimal variation across the layer. But large thicknesses of these layers not only drive up the tool's costs but also result in heating variations during curing of the parts. The method also requires the use of two substructures 16 and 20 and the substructures are positioned on top of the respective layers. In this regard, warping, twisting and racking of the substructures and the respective layers relative to each other are introduced during fabrication when the substructures are affixed to the respective layers.

Accordingly, it is desirable to provide methods for fabricating composite tools that utilize a reduced number of heating cycles. In addition, it is desirable to provide methods for fabricating composite tools that utilize relatively thin laminate layers. It is also desirable to provide methods for fabricating composite tools that utilize fewer substructures. It is further desirable to provide composite tools that are made from such methods. Furthermore, other desirable features and characteristics of the present invention will become apparent from the subsequent detailed description of the invention and the appended claims, taken in conjunction with the accompanying drawings and this background of the invention.

BRIEF SUMMARY

Methods for fabricating composite tools and composite tools are provided. In an exemplary embodiment, a method for fabricating a composite tool includes providing a master mold and forming a low temperature cured resin laminate overlying the master mold. The low temperature cured resin laminate is heated and compressed to form a cured low temperature cured resin laminate, the low temperature cured resin laminate heated to a first temperature. The cured low temperature cured resin laminate is removed from the master mold and a high temperature cured resin laminate is formed overlying the cured low temperature cured resin laminate. The high temperature cured resin laminate is heated and compressed to form a cured high temperature cured resin laminate. The high temperature cured resin laminate is heated to a second temperature, wherein the second temperature is higher than the first temperature.

In accordance with another exemplary embodiment, a method for fabricating a composite part includes providing a master mold and forming a substructure using dimensions of the master mold. A low temperature cured resin laminate is formed overlying the master mold. The low temperature cured resin laminate comprises a resin that is cured at a temperature in the range of from about 20 to 90° C. (68 to 194° F.). The low temperature cured resin laminate is heated and compressed to form a cured low temperature cured resin laminate. The low temperature cured resin laminate is heated to a first temperature in the range of about 20 to 90° C. (68 to 194° F.). The cured low temperature cured resin laminate is removed from the master mold and the cured low temperature cured resin laminate and the substructure are affixed. A high temperature cured resin laminate is formed overlying the cured low temperature cured resin laminate. The high temperature cured resin laminate comprises a resin that is cured at a temperature in the range of from about 191° C. to about 226° C. (from about 375° F. to about 440° F.).

The high temperature cured resin laminate is heated and compressed to form a cured high temperature cured resin laminate. The high temperature cured resin laminate is heated to a second temperature, wherein the second temperature is higher than the first temperature.

In accordance with a further exemplary embodiment, a composite tool includes a substructure, a cured low temperature cured resin laminate overlying the substructure, and a cured high temperature cured resin laminate overlying the cured low temperature cured resin laminate.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various embodiments herein relate to methods for fabricating composite tools. The methods utilize a reduced number of heating cycles than conventional methods for fabricating composite tools, thus resulting in faster fabrication processes at reduced costs. The methods further utilize relatively thin layers of laminates and fewer substructures compared to conventional methods. This in turn also results in faster and more uniform fabrication processes at reduced costs. The various embodiments herein further relate to composite tools made from such methods.

FIGS. 4-9 illustrate methods for making a composite tool 76 in accordance with various embodiments. The described process steps, procedures, and materials are to be considered only as exemplary embodiments. Various steps in the manufacture of composite structures are well known and so, in the interest of brevity, some conventional steps will only be mentioned briefly herein or will be omitted entirely without providing the well-known process details.

Figure 1:
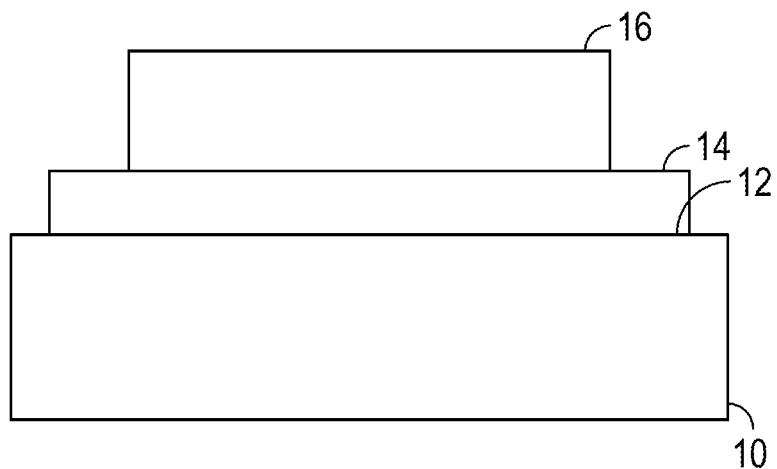
FIGS. 1-3 illustrate in side view a conventional method for fabricating a composite tool.
Figure 2:
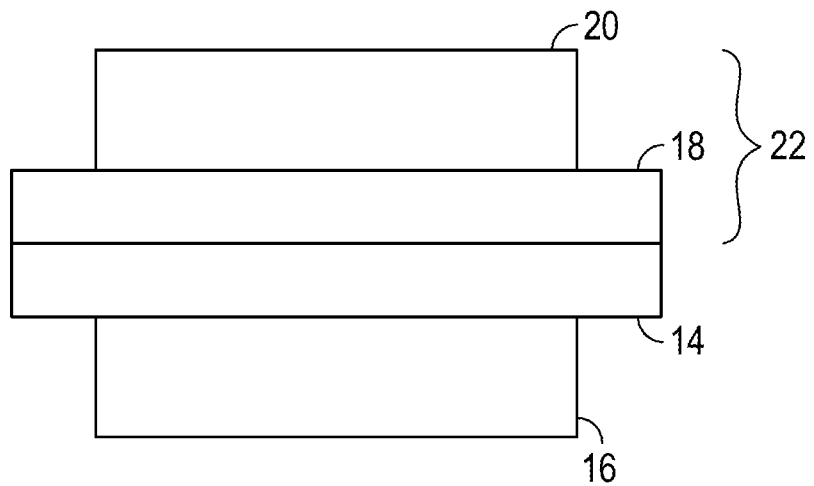
Figure 3:
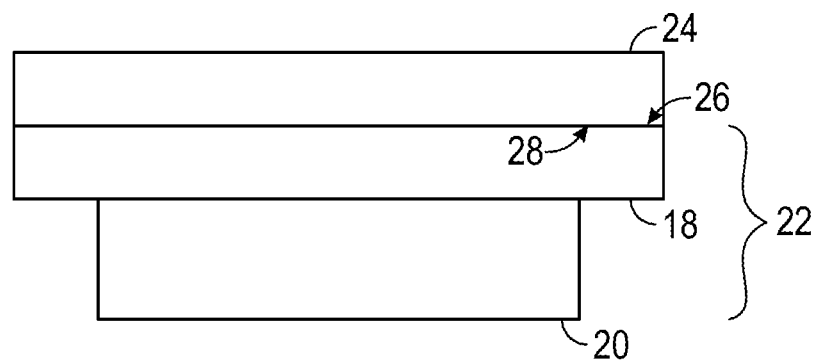
Figure 4:
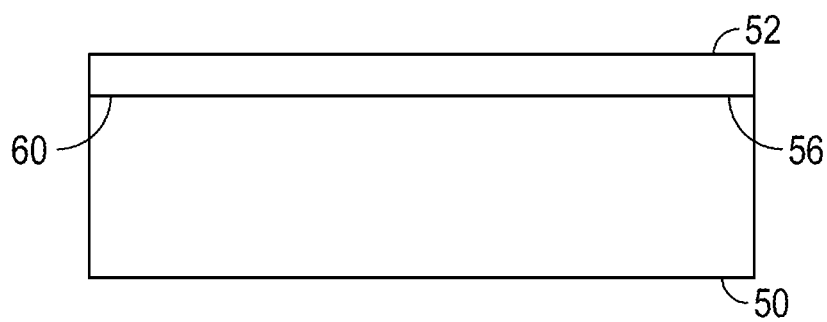
FIGS. 4-8 illustrate in side view a method for fabricating a composite tool in accordance with exemplary embodiments.
Figure 5:
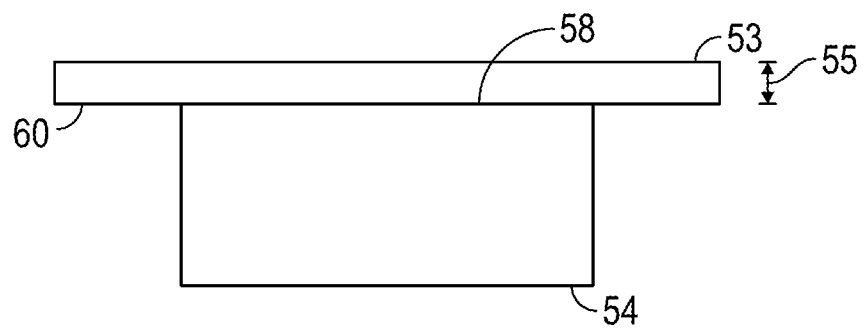

With reference now to FIGS. 4-5, in an exemplary embodiment, a method for fabricating a composite tool includes providing a master mold 50. The master mold 50 is formed from a block of material that may be easily cut or otherwise shaped or conformed to desired specifications and dimensions and can withstand heating and compression required to cure low temperature resin prepreg plies that will be arranged thereon, as discussed in more detail below. The master mold 50 is formed by removing material from the block of material to achieve desired and/or predetermined specifications and dimensions. Referring momentarily to FIG. 9, any tooling hole, threaded insert or other tooling feature 82 that will be necessary to form a part from the composite tool can be cut or otherwise shaped in the block of material to form master mold 50. Examples of material suitable for forming the master mold 50 include foam, medium density fiberboard, wood blocks, and the like.

In an exemplary embodiment, a low temperature cured resin laminate 52 is formed overlying the master mold 50 by arranging a plurality of low temperature cured resin prepreg plies overlying the master mold 50. As used herein, the term "low temperature cured resin prepreg ply" refers to a layer of reinforcing fibers pre-impregnated with a low temperature cured resin as is well known in the art. The prepreg plies may include layers of unidirectional fiber reinforced prepreg, cloth or woven fiber reinforced prepreg, nonwoven fiber reinforced prepreg, random fiber reinforced prepreg, braided fiber reinforced prepreg, continuous fiber reinforced prepreg, and/or discontinuous fiber reinforced prepreg. Non-limiting examples of reinforcing fibers include S-glass fibers, E-glass fibers, carbon fibers, ceramic fibers, metallic fibers, polymeric fibers, and the like. Non-limiting examples of polymeric low temperature cured resins include resins that are cured at temperatures in the range of 20 to 90° C. (68 to 194° F.) such as, for example, low temperature cured epoxy resins. An example of a low temperature cured resin prepreg ply includes LTM 12 available from Cytec Solvay of Brussels. As used herein, the term "cure" as in "to cure" means to change the physical properties of a material by chemical reaction or vulcanization. As used herein, the term "overlying" means "on," as when a first layer is in direct contact with a second layer, or "over," as when a first layer is over a second layer and a third layer is interposed therebetween. Other reinforcing fibers and/or low temperature cured resin prepreg plies known to those skilled in the art of fiber reinforced composite materials may also be used.

Once the low temperature cured resin prepreg plies are arranged overlying the master mold 50, the plies are subjected to heating and compression to cure the plies and form cured low temperature cured resin laminate 53. Well known processes and conditions for applying heat and compression to uncured fiber reinforced materials, such as using an autoclave in combination with a vacuum bag arrangement, may be used to cure the low temperature cured resin laminate 52. As noted above, in an exemplary embodiment, depending on the low temperature cured resin prepreg plies used to form laminate 52, the low temperature cured resin laminate 52 is heated to a temperature in the range of from about 20 to 90° C. (68 to 194° F.). In an exemplary embodiment, the resulting cured low temperature cured resin laminate 53 has a thickness 55 in the range of from about 3.175 to about 4.763 mm (about 0.125 to about 0.188 inches). The thickness 55 of cured low temperature cured resin laminate 53 is thinner than thicknesses of typical intermediate mold layers used in conventional methods of manufacturing composite tools described above, and allows for substantially uniform heating of the cured low temperature cured resin laminate 53 during the heating and compression cycle.

In an exemplary embodiment, a substructure 54 is formed from the master mold 50. In this regard, a surface 58 of the substructure is formed to the same surface topography as a surface 56 of the master mold 50. In one embodiment, the dimensions of the surface 58 of the substructure 54, that is, the width and/or length, are smaller than the width and/or length of the surface 56 of the master mold 50. For example, the width and/or length of the surface 58 can be from about 10.16 cm (4 inches) to about 20.32 cm (8 inches), such as about 15.24 cm (6 inches), smaller than the width and/or length of the surface 56 of the master mold. In one embodiment, the substructure is formed of fiber reinforced polymer (FRP). The FRP may include a thermoset or thermoplastic polymer, such as epoxy, polyester, vinyl ester or nylon, and may contain fibers such as carbon fibers, glass fibers, ultra-high molecular weight polyethylene fibers, aluminum fibers, and the like. Such FRP materials can be in the form of, for example, braided fabric, woven fabric, unidirectional tape, sheet molding compound, or bulk molding compounds. In an exemplary embodiment, the substructure is formed by computer numeric control (CNC) machining. It will be appreciated, however, that the substructure could be formed from other materials such as metal or any other material that can withstand the temperatures necessary for curing a high temperature cured resin laminate to be formed overlying the substructure 54, as described in more detail below.

In an embodiment, the cured low temperature cured resin laminate 53 is removed from the master mold 50 and is affixed to the substructure 54. In this regard, unlike during fabrication of conventional tooling, as described above, the substructure 54 can be deposed or positioned on a horizontal, flat, and stable surface and the cured low temperature cured resin laminate 53 can be positioned on the substructure 54 in a manner such that warping, twisting or racking of either member relative to the other is minimized or eliminated altogether. The cured low temperature cured resin laminate 53 and the substructure 54 can be affixed together using any suitable fixing mechanism such as adhesives, laminate tie plies, and the like. Other mechanisms for enhancing coupling of the cured low temperature cured resin laminate 53 and substructure 54, such as the use of peel ply fabrics known in the art, can also be used. As an underside surface 60 of the cured low temperature cured resin laminate 53 was formed to the surface 56 of master mold 50, and as the surface 58 of the substructure 54 has the same surface topography as master mold 50, underside surface 60 of cured low temperature cured resin laminate 53 is able to make intimate contact with surface 58 of substructure 54 with minimal inaccuracies and instabilities. In one embodiment, wherein the width and/or length of surface 58 of substructure 54 was made smaller than the width and/or length of surface 56 of master mold 50, underside surface 60 of cured low temperature cured resin laminate 53 extends beyond surface 58 of substructure 54, as illustrated in FIG. 5.

Figure 6:
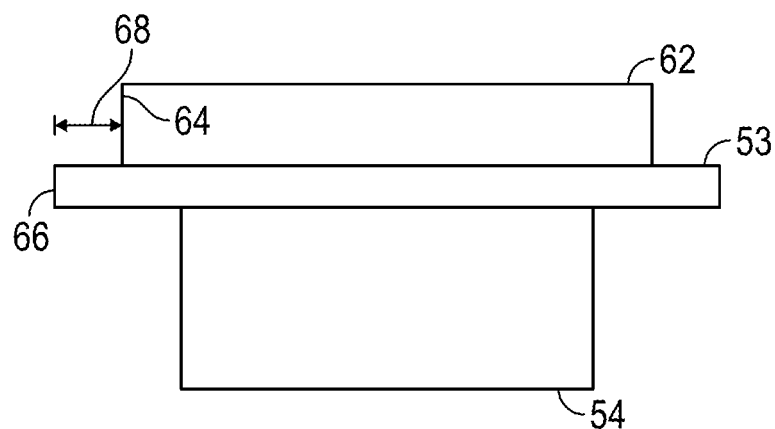

In another embodiment, referring to FIG. 6, a high temperature cured resin laminate 62 is formed overlying the cured low temperature cured resin laminate 53. The high temperature cured resin laminate 62 is formed by arranging a plurality of high temperature cured resin prepreg plies overlying the cured low temperature cured resin laminate 53. As used herein, the term "high temperature cured resin prepreg ply" refers to a layer of reinforcing fibers pre-impregnated with a high temperature cured resin as is well known in the art. The prepreg plies may include layers of unidirectional fiber reinforced prepreg, cloth or woven fiber reinforced prepreg, nonwoven fiber reinforced prepreg, random fiber reinforced prepreg, braided fiber reinforced prepreg, continuous fiber reinforced prepreg, and/or discontinuous fiber reinforced prepreg. Non-limiting examples of reinforcing fibers include S-glass fibers, E-glass fibers, carbon fibers, ceramic fibers, metallic fibers, polymeric fibers, and the like. Non-limiting examples of polymeric high temperature cured resins include resins that are cured at temperatures in the range of from about 191° C. to about 226° C. (from about 375° F. to about 440° F.) such as, for example, 216° C. (420° F.), such as BMIs or benzoxazines. An example of a high temperature cured resin prepreg ply fabricated with BMI resin includes HEXTOOL® M61 tooling compound available from Hexcel Corporation of Stamford, Conn. Examples of high temperature cured resin prepreg plies fabricated with benzoxazine include Beta Prepreg systems available from Airtech of Luxemburg. Other reinforcing fibers and/or high temperature cured resins known to those skilled in the art of fiber reinforced composite materials may also be used. In an exemplary embodiment, the high temperature cured resin laminate 62 is formed such that it has an outside edge 64 that is a distance 68 from an outside edge 66 of cured low temperature cured resin laminate 53. This distance 68 results in an area of cured low temperature cured resin laminate 53 upon which tacky tape or other methods of fixation can be placed to facilitate affixing of a vacuum bag used for heating and compression of the high temperature cured resin laminate 62, as discussed in more detail below.

Figure 7:
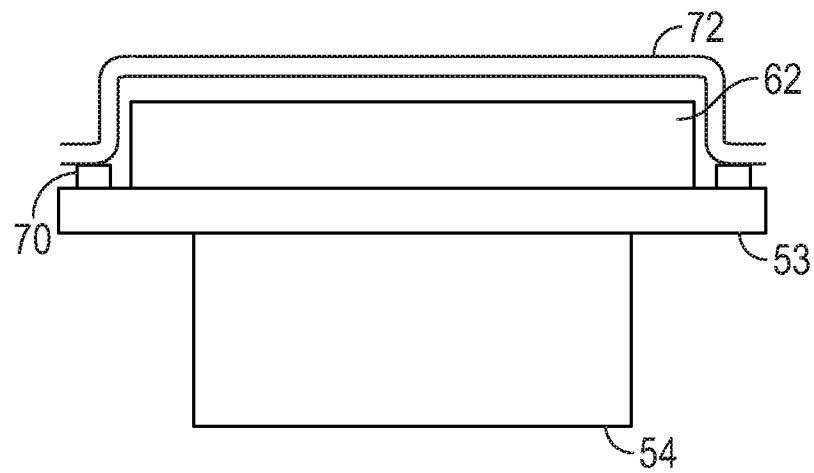
Figure 8:
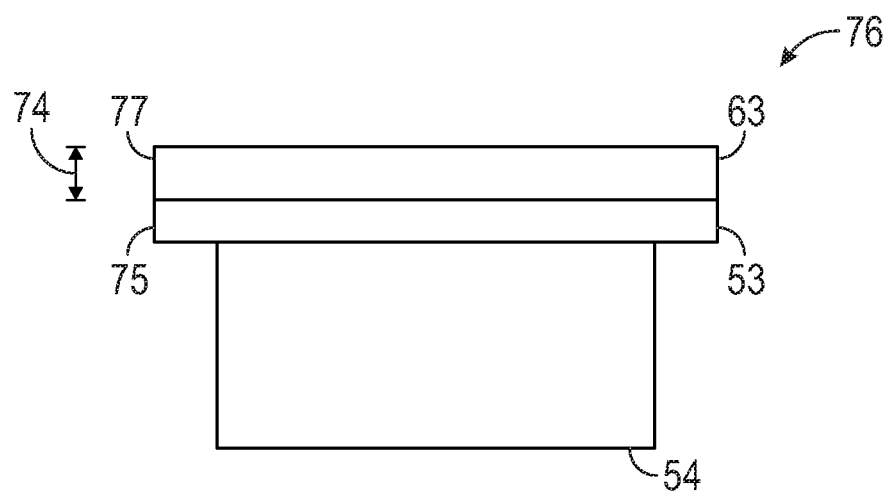

Referring to FIGS. 7 and 8, once the high temperature cured resin prepreg plies are arranged overlying the cured low temperature cured resin laminate 53, the plies are subjected to heating and compression to cure the plies, thus forming a cured high temperature cured resin laminate 63. Well known processes and conditions for applying heat and compression to uncured fiber reinforced materials, such as using an autoclave in combination with a vacuum bag arrangement, may be used to cure the high temperature cured resin laminate 62. For example, referring to FIG. 7, the distance 68 can be utilized for placement of tacky tape 70 or other mechanism for securing a vacuum bag 72 to the cured low temperature cured resin laminate 53 to isolate the high temperature cured resin laminate 62 for compression. As noted above, in an exemplary embodiment, depending on the high temperature cured resin prepreg plies used to form laminate 62, the high temperature cured resin laminate 62 is heated to a temperature in the range of from about 191° C. to 226° C. (375 to 440° F.). In an exemplary embodiment, the resulting cured high temperature cured resin laminate 63 has a thickness 74 in the range of from about 2.5 to 10.2 mm (0.1 to 0.4 inches), for example, about 6.35 mm (0.25 inches). In another embodiment, the cured high temperature cured resin laminate 63 does not vary more than 1.5 mm (0.06 inches) in thickness. The thickness 74 of cured high temperature cured resin laminate 63 is thinner than thicknesses of typical BMI or benzoxazine laminate layers used in conventional methods of manufacturing composite tools described above, and allows for substantially uniform heating of the cured high temperature cured resin laminate 63 during the heating and compression cycle. After the heating and compression processes are performed, the vacuum bag 72 and any tacky tape 70 are removed from the resulting composite tool 76, which, as illustrated in FIG. 8, is comprised of the substructure 54, the cured low temperature cured resin laminate 53 and the cured high temperature cured resin laminate 63.

In an exemplary embodiment, machining of the composite tool 76 then can be performed as may be desired. For example, edges 77 of cured high temperature cured resin laminate 63 and edges 75 of cured low temperature cured resin laminate 53 may be machined so that they are even and/or flush with each other, as depicted in FIG. 8. As noted above with respect to FIG. 5, where the width and/or length of surface 58 of substructure 54 was made smaller than the width and/or length of surface 56 of master mold 50, cured high temperature cured resin laminate 63 and cured low temperature cured resin laminate 53 extend beyond substructure 54. In this regard, material from edges 77 and 75 can be safely removed without material removal from substructure 54.

Figure 9A:
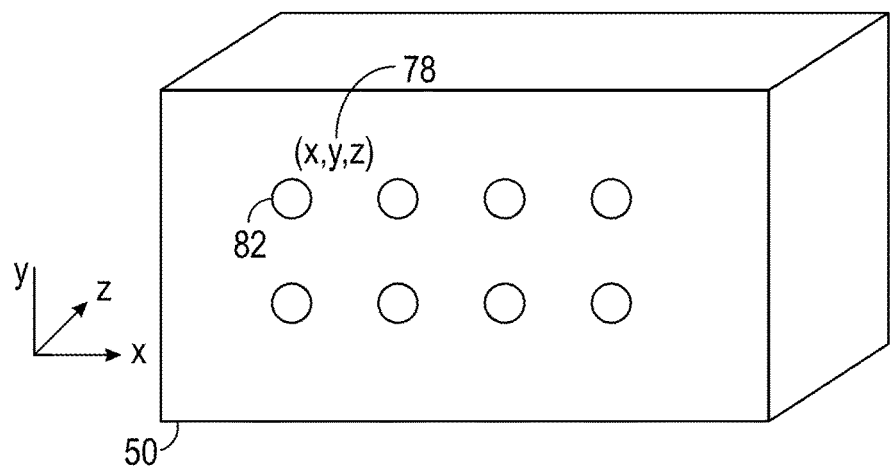
FIG. 9 is a perspective view illustrating coordinates of a tooling feature of the master mold (FIG. 9(a)), the cured low temperature cured resin laminate (FIG. 9(b)), and the cured high temperature cured resin laminate (FIG. 9(c)) of the composite tool of FIG. 8.
Figure 9B:
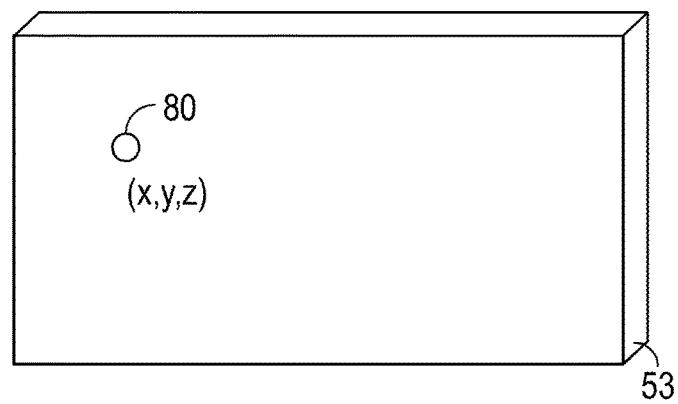
Figure 9C:
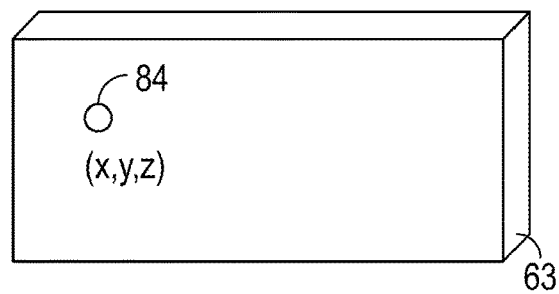

Because composite tool 76 utilizes cured low temperature cured resin laminate 53 rather than disposing of such laminate as an intermediate mold, which is performed in the prior art, machining of any tooling holes, threaded inserts or other tooling features of composite tool 76 is particularly facilitated. As noted above, the underside surface 60 of the cured low temperature cured resin laminate 53 is formed to the surface 56 of master mold 50, as illustrated in FIGS. 4 and 5. In this regard, any tooling holes, threaded inserts or other tooling features in master mold 50 are positively transferred to the cured low temperature cured resin laminate 53 and, correspondingly, to the cured high temperature cured resin laminate 63. As the cured low temperature cured resin laminate 53 is formed, for example, by CNC machining, to the same outside dimensions of the master mold 50, a coordinate (x, y, z) 80 on the cured low temperature cured resin laminate 53, illustrated in FIG. 9(b) is known from a coordinate (x, y, z) 78 of a tooling feature 82 of the master mold 50, as illustrated in FIG. 9(a). As the dimensions of the cured high temperature cured resin laminate 63 are made with specificity with respect to the cured low temperature cured resin laminate 53, a feature with a coordinate (x, y, z) 84 positively transferred to the cured high temperature cured resin laminate 63 is known from the coordinate 80 on the cured low temperature cured resin laminate 53 and correspondingly from the coordinate 78 of the tooling feature 82 of the master mold 50, as illustrated in FIG. 9(c). Accordingly, any machining of tooling features on the cured high temperature cured resin laminate 63 can be easily performed using the known coordinates of the tooling features 82 of the master mold 50.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for fabricating a composite tool, the method comprising the steps of:
   providing a master mold having a surface;
   forming a substructure such that a topographical surface of the substructure is formed to the same surface topography as the surface of the master mold;
   forming a low temperature cured resin laminate overlying the master mold, wherein the low temperature cured resin laminate has a master mold surface that is formed in contact with the master mold;
   heating and compressing the low temperature cured resin laminate to form a cured low temperature cured resin laminate, the low temperature cured resin laminate heated to a first temperature;
   removing the cured low temperature cured resin laminate from the master mold;
   affixing the master mold surface of the cured low temperature cured resin laminate and the topographical surface of the substructure;
   forming a high temperature cured resin laminate overlying the cured low temperature cured resin laminate; and
   heating and compressing the high temperature cured resin laminate to form a cured high temperature cured resin laminate, the high temperature cured resin laminate heated to a second temperature, wherein the second temperature is higher than the first temperature.

2. The method of claim 1, wherein providing the master mold comprises providing a material block and removing material from the material block.

3. The method of claim 2, wherein providing the material block comprises providing a block of foam, wood, or medium density fiberboard.

4. The method of claim 1, wherein forming the low temperature cured resin laminate overlying the master mold comprises arranging a plurality of low temperature cured resin prepreg plies overlying the master mold.

5. The method of claim 1, wherein forming the low temperature cured resin laminate comprises forming the low temperature cured resin laminate comprising a resin that is cured at a temperature in the range of from about 20 to 90° C. (68 to 194° F.).

6. The method of claim 5, wherein forming the low temperature cured resin laminate comprises forming a low temperature cured epoxy laminate.

7. The method of claim 1, wherein heating and compressing the low temperature cured resin laminate comprises heating the low temperature cured resin laminate to the first temperature in the range of about 20 to 90° C. (68 to 194° F.).

8. The method of claim 1, wherein removing the cured low temperature cured resin laminate comprises removing the cured low temperature cured resin laminate having a thickness in the range of about 3.175 to about 4.763 mm (about 0.125 to about 0.188 inches).

9. The method of claim 1, wherein forming the high temperature cured resin laminate comprises arranging a plurality of high temperature cured resin prepreg plies overlying the cured low temperature cured resin laminate.

10. The method of claim 1, wherein forming the high temperature cured resin laminate comprises forming the high temperature cured resin laminate comprising a resin that is cured at a temperature in the range of from about 191° C. to about 226° C. (from about 375° F. to about 440° F.).

11. The method of claim 10, wherein forming the high temperature cured resin laminate comprises forming the high temperature cured resin laminate comprising BMI or benzoxazine.

12. The method of claim 1, wherein heating and compressing the high temperature cured resin laminate to form the cured high temperature cured resin laminate comprises heating and compressing the high temperature cured resin laminate to form the cured high temperature cured resin laminate having a thickness in the range of about 2.5 to 10.2 mm (0.1 to 0.4 inches).

13. The method of claim 1, wherein forming a substructure comprises forming the substructure by computer numeric control (CNC) machining.

14. The method of claim 1, wherein heating and compressing the high temperature cured resin laminate comprises heating the high temperature cured resin laminate to the second temperature in the range of about 191° C. to about 226° C. (from about 375° F. to about 440° F.).

15. A method for fabricating a composite part, the method comprising the steps of:
   providing a master mold having a surface;
   forming a substructure such that a topographical surface of the substructure is formed to the same surface topography as the surface of the master mold;
   forming a low temperature cured resin laminate overlying the master mold, wherein the low temperature cured resin laminate comprises a resin that is cured at a temperature in the range of from about 20 to 90° C. (68 to 194° F.) and wherein the low temperature cured resin laminate has a master mold surface that is formed in contact with the master mold;

heating and compressing the low temperature cured resin laminate to form a cured low temperature cured resin laminate, the low temperature cured resin laminate heated to a first temperature in the range of about 20 to 90° C. (68 to 194° F.);

removing the cured low temperature cured resin laminate from the master mold;

affixing the master mold surface of the cured low temperature cured resin laminate and the topographical surface of the substructure;

forming a high temperature cured resin laminate overlying the cured low temperature cured resin laminate, the high temperature cured resin laminate comprising a resin that is cured at a temperature in the range of from about 191° C. to about 226° C. (from about 375° F. to about 440° F.); and heating and compressing the high temperature cured resin laminate to form a cured high temperature cured resin laminate, the high temperature cured resin laminate heated to a temperature in the range of from about 191° C. to about 226° C. (from about 375° F. to about 440° F.).

16. The method of claim 15, wherein forming a substructure comprises forming the substructure by computer numeric control (CNC) machining.

17. The method of claim 15, wherein removing the cured low temperature cured resin laminate comprises removing the cured low temperature cured resin laminate having a thickness in the range of about 3.175 to about 4.763 mm (about 0.125 to about 0.188 inches).

18. The method of claim 15, wherein heating and compressing the high temperature cured resin laminate to form the cured high temperature cured resin laminate comprises heating and compressing the high temperature cured resin laminate to form the cured high temperature cured resin laminate having a thickness in the range of about 2.5 to 10.2 mm (0.1 to 0.4 inches).

19. The method of claim 18, wherein forming the high temperature cured resin laminate comprises forming the high temperature cured resin laminate comprising BMI or benzoxazine.

* * * * *